(12) United States Patent
Kano

(10) Patent No.: US 12,555,202 B2
(45) Date of Patent: Feb. 17, 2026

(54) IMAGE PROCESSING APPARATUS AND IMAGE PROCESSING METHOD

(71) Applicant: CANON KABUSHIKI KAISHA, Tokyo (JP)

(72) Inventor: Akira Kano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 398 days.

(21) Appl. No.: 17/975,287

(22) Filed: Oct. 27, 2022

(65) Prior Publication Data
US 2023/0146844 A1 May 11, 2023

(30) Foreign Application Priority Data
Nov. 5, 2021 (JP) ................................. 2021-181437

(51) Int. Cl.
| | | |
|---|---|---|
| G06T 5/70 | (2024.01) | |
| G06T 5/20 | (2006.01) | |
| G06T 5/80 | (2024.01) | |
| H04N 5/262 | (2006.01) | |

(52) U.S. Cl.
CPC ................ G06T 5/70 (2024.01); G06T 5/20 (2013.01); G06T 5/80 (2024.01); H04N 5/2621 (2013.01); G06T 2200/24 (2013.01)

(58) Field of Classification Search
None
See application file for complete search history.

(56) References Cited

U.S. PATENT DOCUMENTS

| | | | | |
|---|---|---|---|---|
| 4,871,242 | A * | 10/1989 | Sousa | G02B 3/0043 |
| | | | | 359/707 |
| 8,335,390 | B2 * | 12/2012 | Li | G06T 5/20 |
| | | | | 396/63 |
| 9,185,300 | B2 | 11/2015 | Yim | |
| 9,418,400 | B2 * | 8/2016 | Sakharnykh | G06T 5/75 |
| 2007/0252951 | A1 * | 11/2007 | Hammer | G01S 17/66 |
| | | | | 351/221 |

(Continued)

FOREIGN PATENT DOCUMENTS

| | | | | |
|---|---|---|---|---|
| JP | 2001204962 | A * | 7/2001 | ............. G06T 15/04 |
| JP | 2014150498 | A | 8/2014 | |

(Continued)

OTHER PUBLICATIONS

The above patent documents were cited in the Jul. 7, 2025 Japanese Office Action, which is enclosed without an English Translation, that issued in Japanese Patent Application No. 2021-181437.

*Primary Examiner* — Randolph I Chu (74) *Attorney, Agent, or Firm* — Cowan, Liebowitz & Latman, P.C.

(57) ABSTRACT

An image processing apparatus applies, to an input image, image restoration processing for correcting bokeh caused by a characteristic of an imaging optical system used to capture the input image. The image processing apparatus may further add a predetermined effect to a high luminance portion satisfying a predetermined condition in the input image to which the image restoration processing has been applied. The image processing apparatus has capabilities both correcting bokeh caused by an aberration in an optical system while keeping bokeh as photographic expression.

12 Claims, 9 Drawing Sheets

(56) References Cited

U.S. PATENT DOCUMENTS

| | | | |
|---|---|---|---|
| 2009/0052050 A1* | 2/2009 | Kweon | G02B 13/06 359/668 |
| 2013/0230259 A1* | 9/2013 | Intwala | G06T 5/20 382/255 |
| 2018/0052332 A1* | 2/2018 | Meng | G02B 27/281 |
| 2019/0318487 A1* | 10/2019 | Lin | G06T 7/13 |
| 2020/0128216 A1* | 4/2020 | Siddiqui | H04N 23/843 |
| 2020/0372615 A1* | 11/2020 | Ida | G06T 5/20 |
| 2021/0233210 A1* | 7/2021 | Elron | G06T 5/50 |
| 2025/0232852 A1* | 7/2025 | Dormer | G16H 50/20 |

FOREIGN PATENT DOCUMENTS

| | | |
|---|---|---|
| JP | 6091176 B | 3/2017 |
| JP | 2020201540 A | 12/2020 |

* cited by examiner

IMAGE PROCESSING APPARATUS AND IMAGE PROCESSING METHOD

BACKGROUND OF THE INVENTION

Field of the Invention

The present invention relates to an image processing apparatus and an image processing method and particularly relates to technology for correcting images.

Description of the Related Art

Japanese Patent No. 6091176 discloses image restoration technology that corrects bokeh in an image caused by an aberration in an imaging optical system using an optical transfer function (OTF) of the imaging optical system. By correcting the bokeh caused by an aberration, the sharpness of an image can be increased. However, problematically, bokeh that the user would like to maintain as photographic expression is also corrected.

SUMMARY OF THE INVENTION

In light of such problems in known technology, the present invention provides, as an aspect, an image processing apparatus capable of both correcting bokeh caused by an aberration in an optical system while keeping bokeh as photographic expression.

According to an aspect of the present invention, there is provided an image processing apparatus comprising: one or more processors, when executing a program stored in a memory, function as: a restoration unit configured to apply, to an input image, image restoration processing for correcting bokeh caused by a characteristic of an imaging optical system used to capture the input image; and an application unit configured to add a predetermined effect to a high luminance portion satisfying a predetermined condition in the input image to which the image restoration processing has been applied.

According to another aspect of the present invention, there is provided an image capture apparatus comprising: an image sensor; and an image processing apparatus, wherein the image processing apparatus comprising: one or more processors, when executing a program stored in a memory, function as: a restoration unit configured to apply, to an input image captured by the image sensor, image restoration processing for correcting bokeh caused by a characteristic of an imaging optical system used to capture the input image; and an application unit configured to add a predetermined effect to a high luminance portion satisfying a predetermined condition in the input image to which the image restoration processing has been applied.

According to a further aspect of the present invention, there is provided an image processing method executed by an image processing apparatus comprising: applying, to an input image, image restoration processing for correcting bokeh caused by a characteristic of an imaging optical system used to capture the input image; and adding a predetermined effect to a high luminance portion satisfying a predetermined condition in the input image to which the image restoration processing has been applied.

According to another aspect of the present invention, there is provided a non-transitory computer-readable medium that stores a program for causing, when executed by one or more processor, the one or more processors to function as an image processing apparatus comprising: a restoration unit configured to apply, to an input image, image restoration processing for correcting bokeh caused by a characteristic of an imaging optical system used to capture the input image; and an application unit configured to add a predetermined effect to a high luminance portion satisfying a predetermined condition in the input image to which the image restoration processing has been applied.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the embodiments described below, a digital camera is used as an example of the present invention. However, an image sensor, an imaging optical system, and other imaging functions are not required for the present invention. The present invention can be implemented with any electronic device capable handling image data. Examples of such an electronic device include, in addition to an image capture apparatus, computer devices (personal computers, tablet computers, media players, PDAs, and the like), mobile phones, smartphones, game consoles, robots, drones, and drive recorders. These are examples, and the present invention can be implemented with other electronic devices.

First Embodiment

Figure 1:
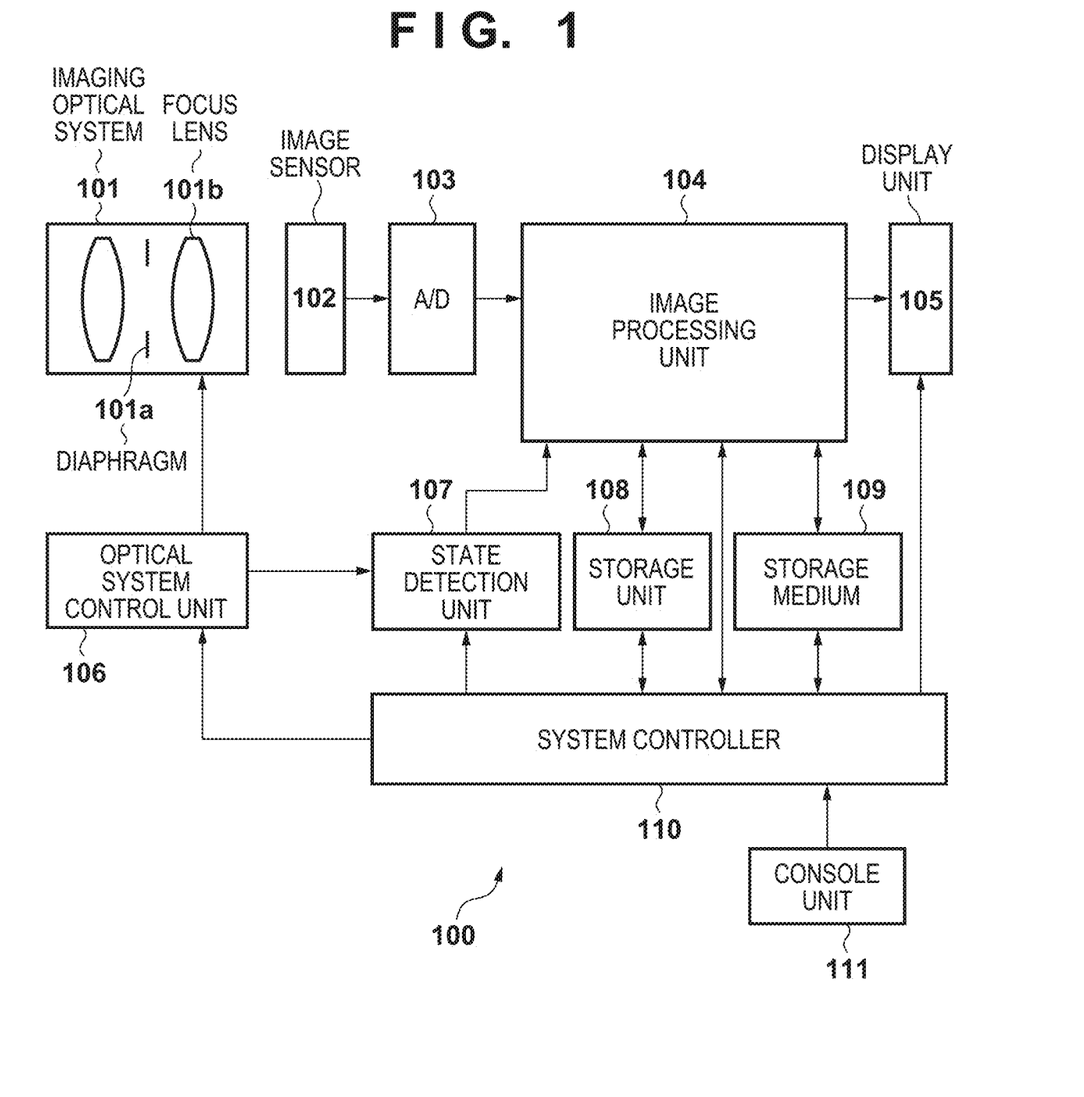
FIG. 1 is a block diagram illustrating an example of the functional configuration of a digital camera according to a first embodiment.

FIG. 1 is a block diagram illustrating a functional configuration example of a digital camera 100 representing an image processing apparatus according to the present invention.

An imaging optical system 101, for example, is a detachable lens unit and includes a plurality of lenses including a focus lens 101b and a diaphragm 101a. Also, the imaging optical system 101 includes a motor, actuator, and the like for driving the movable members of the diaphragm 101a, the focus lens 101b, and the like. The imaging optical system 101 produces an optical image of an object on an image forming surface of an image sensor 102.

The image sensor 102 may be a known charge-coupled device (CCD) image sensor or a complementary metal-oxide-semiconductor (CMOS) image sensor. The image sensor 102 includes a pixel array including a plurality of pixel with a photoelectric conversion unit arranged in a two-dimensional pattern. By storing charge corresponding to the incident light amount of the pixels, the optical image of the object is converted to a pixel signal group (analog image signal).

The analog image signal is converted to a digital image signal at an A/D converter 103 and input to an image processing unit 104. Note that in a case in which the image sensor 102 has an A/D converter function, the digital image signal is input from the image sensor 102 to the image processing unit 104.

The image processing unit 104 applies various processing to the digital image signal, generates a signal and/or image data, and acquires and/or generates various types of information. The image processing unit 104 may be, for example, a dedicated hardware such as an application-specific integrated circuit (ASIC) designed to realize a specific function or may be configured to realize a specific function via a programmable processor such as a digital signal processor (DSP) executing a software.

Herein, the image processing applied by the image processing unit 104 includes color interpolation processing, correction processing, detection processing, data modification processing, evaluation value calculation processing, special effects processing, and the like.

The color interpolation processing is processing for interpolating values of color components not obtained when shooting, and is also referred to as demosaicing processing.

Correction processing includes various processing including white balance adjustment, gradation correction, correction (image restoration) of image degradation caused by an optical aberration in the imaging optical system 101, correction of the effects of vignetting of the imaging optical system 101, color correction, and the like.

The detection processing includes processing for detecting a feature area (for example, a face area or a human body area) or movement thereof, processing for recognizing a person, and the like.

The data modification processing includes processing including combining, scaling, encoding and decoding, header information generation (data file generation), and the like.

The evaluation value calculation processing includes processing including generating signals or evaluation values that are used in automatic focus detection (AF), generating evaluation values that are used in automatic exposure control (AE), and the like.

Special effects processing includes processing including adding a bokeh effect, changing color tone, relighting, and the like.

Note that the processing described above are examples of the processing that can be applied by the image processing unit 104, and they are not intended to limit the processing applied by the image processing unit 104.

The image processing unit 104 is capable of generating image data in accordance with the application. For example, image data for storing may be stored in a data file with a format compliant with the settings and is stored in a storage medium 109 such as a memory card. Also, image data for display may be displayed on a display unit 105.

The display unit 105 is a display apparatus including a video memory, a display control circuit, and a display panel, for example. The display unit 105 displays images based on image data generated by the image processing unit 104 or graphical user interface (GUI) data supplied from a system controller 110. The display panel of the display unit 105 may be a touch display panel.

A state detection unit 107 acquires the current imaging state of the digital camera 100 from the system controller 110. The imaging state may be an image capture condition including the current focal length, f-number, focusing distance (object distance), or the like of the imaging optical system 101, for example. The imaging state may include other information including image capture conditions such as the ISO sensitivity, specific information (product name, model, and the like) of the imaging optical system 101, and the like. The state detection unit 107 may acquire, as the imaging state, information relating to the imaging optical system 101 from an optical system control unit 106. The state detection unit 107 supplies the acquired imaging state to the image processing unit 104.

A storage unit 108 is a storage apparatus capable of access by the image processing unit 104 and the system controller 110 and is a memory or magnetic storage apparatus, for example. The storage unit 108 includes at least a non-volatile area. In the non-volatile area of the storage unit 108, parameters of an image restoration filter of the imaging optical system 101 and/or data or information for generating an image restoration filter are associated with different imaging states and stored. The information for generating an image restoration filter may be information relating to the optical transfer function (OTF) of the imaging optical system 101, for example.

The system controller 110 includes one or more processors (hereinafter referred to as a CPU) capable of executing a program, a non-volatile memory, and a working memory. By a program stored in the non-volatile memory being load onto the working memory and executed by the CPU, the system controller 110 controls the operations of the components of the digital camera 100 and the imaging optical system 101 and provides the functions of the digital camera 100. Note that in the case in which the imaging optical system 101 is replaceable, the system controller 110 communicates with a controller provided in the imaging optical system 101 and controls the operation of the imaging optical system 101.

A console unit 111 is a collective term for input devices (buttons, switches, dials, and the like) that are provided on the digital camera 100 for the user to input an instruction to the digital camera 100. Each of the input devices constituting the console unit 111 has a name corresponding to the function assigned to it. For example, the console unit 111 includes a release switch, a moving image recording switch, a shooting mode selection dial for selecting a shooting mode, a menu button, a directional key, an enter key, and the like. The release switch is a switch for recording a still image, and the system controller 110 recognizes a half-pressed state of the release switch as an image capture preparation instruction and a fully-pressed state of the release switch as an image capture start instruction. Note that the functions assigned to the same input device may be variable. Also, the input device may be software buttons or keys using a touch display.

Image Restoration Processing

Next, the image restoration processing executed by the image processing unit 104 will be described. The image restoration processing is processing to correct a bokeh in an image mainly caused by an aberration (spherical aberration, coma aberration, curvature of field, astigmatism, and the like) in the imaging optical system 101. More specifically, the image restoration processing includes correcting a bokeh component of an image represented by a point spread function (PSF). PSF is a function representing the intensity distribution of an image of a point light source generated on an imaging surface by the imaging optical system 101. An image of a point light source is an image that is spread due to the effects of aberration in the imaging optical system 101 or diffraction.

Note that a bokeh in an image caused by an aberration of the imaging optical system 101 is different from a bokeh caused when the imaging optical system 101 is not focused on the object and may be caused when the object is in focus.

When a Fourier transform of the PSF of the imaging optical system 101 is performed, the optical transfer function (OTF) of the imaging optical system 101 is obtained. The OTF is represents the frequency component of the aberration of the imaging optical system 101 using a complex number. In a similar manner, when an inverse Fourier transform of the OTF of the imaging optical system 101 is performed, the PSF of the imaging optical system 101 is obtained.

The amplitude component of the OTF is referred to as a modulation transfer function (MTF), and the phase component is referred to as a phase transfer function (PTF). The MTF and the PTF are respectively a frequency characteristic of the amplitude component and the phase component of the image degradation caused by an aberration. A real part and an imaginary part of the OTF are represented by Re(OTF) and Im(OTF), respectively, and when PTF is represented by a phase angle, the follow relationship is established.

$$PTF = \tan^{-1}(Im(OTF)/Re(OTF)) \quad \text{(Formula 1)}$$

In this manner, because the OTF of the imaging optical system 101 degrades the amplitude component and the phase component of the image, the points of the object have asymmetrical bokeh.

Here, when an image generated by the imaging optical system 101 is represented by g(x, y), the original image is represented by f(x, y), and the PSF of the imaging optical system 101 is represented by h(x, y), the following relationship is established.

$$g(x,y) = h(x,y) * f(x,y) \quad \text{(Formula 2)}$$

Here, (x, y) represents the coordinates on an image when a two-dimensional Cartesian coordinate system is used as the image coordinate system, and * represents a convolution operation.

When a Fourier transform is performed on Formula 2 and it is converted to a display form of a frequency surface, the following formula of a form of a product for each frequency is obtained.

$$G(u,v) = H(u,v)F(u,v) \quad \text{(Formula 3)}$$

H(u, v) is the result of a Fourier transform of h(x, y), and thus represents the OTF. Also, coordinates (u, v) are coordinates on the two-dimensional frequency surface, and thus represent the frequency.

To remove the effects of OTF(H(u, v)) of the imaging optical system 101, as described below, both sides of Formula 3 are divided by H(u, v).

$$G(u,v)/H(u,v) = F(u,v) \quad \text{(Formula 4)}$$

F(u, v) represents the form of the frequency, thus, by returning it to an image coordinate system via an inverse Fourier transform, an image f(x, y) with the effects of the OTF of the imaging optical system 101 removed is obtained.

Here, when R(x, y) represents the result of an inverse Fourier transform of 1/H(u, v), a Fourier transform and an inverse Fourier transform are not performed, and an image f(x, y) with the effects of the OTF of the imaging optical system 101 removed via an inverse convolution operation in the image coordinate system can be obtained.

$$g(x,y) * R(x,y) = f(x,y) \quad \text{(Formula 5)}$$

This R(x, y) is referred as an image restoration filter. Because an actual image includes a noise component, when an image restoration filter generated from the inverse 1/H(u, v) of the OTF is used, the noise component is amplified and typically a good image is not obtained. Thus, a method is known that uses a Wiener filter as an image restoration filter, to suppress restoration of a high frequency component of an image according to a strength ratio between image signal and noise signal.

By making the bokeh amount in each color component of the image even using image restoration processing, magnification chromatic aberration of the imaging optical system 101 and color shift caused by the spectral characteristics of each pixel are also corrected.

Note that the OTF of the imaging optical system 101 varies depending on the imaging state, such as the focal length, the f-number, the distance to object, and the like of the imaging optical system 101. Thus, the image restoration filter must also change for each imaging state. Also, in a case in which an optical low-pass filter and/or an infrared cut filter is provided in the imaging optical system 101 or the image sensor 102, an image restoration filter that takes the effects these have on the OTF into account can be used.

Figure 2:
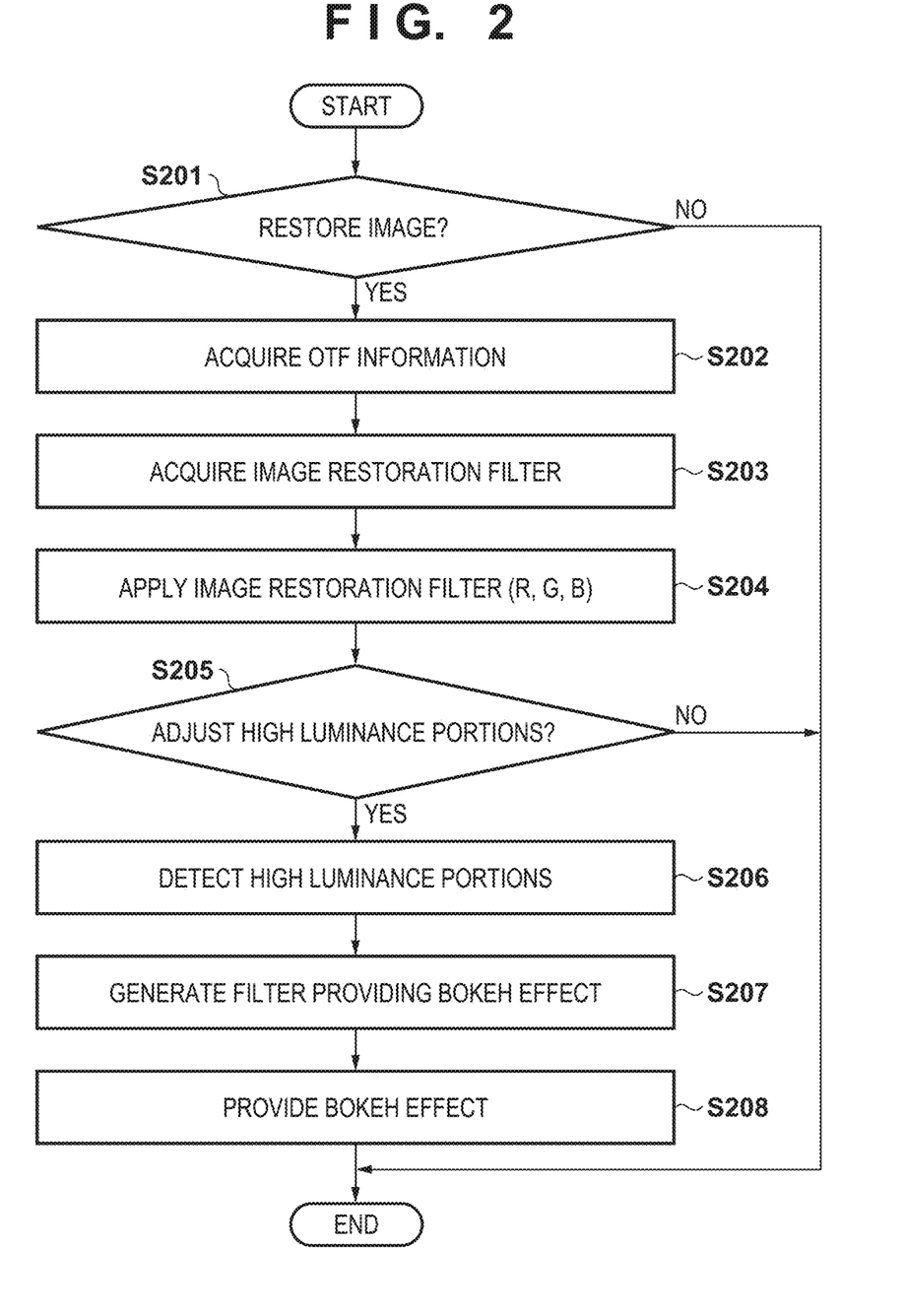
FIG. 2 is a flowchart relating to the operation of an image processing unit 104 according to the first embodiment.

Next, the image restoration processing executed by the image processing unit 104 will be further described using the flowchart illustrated in FIG. 2. Here, the image sensor 102 is provided with a primary-color Bayer array color filter. Accordingly, the digital image signal input to the image processing unit 104 includes one color component of R, G, or B per pixel. The image processing unit 104 applies color interpolation processing before applying image restoration processing and puts each pixel in a state including all color components of R, G, and B.

In step S201, the image processing unit 104 determines whether or not to apply image restoration processing. For example, the image processing unit 104 can determine this on the basis of whether or not a user setting stored in the non-volatile area of the storage unit 108 is a setting to be applied to the image restoration processing.

Figure 3A:
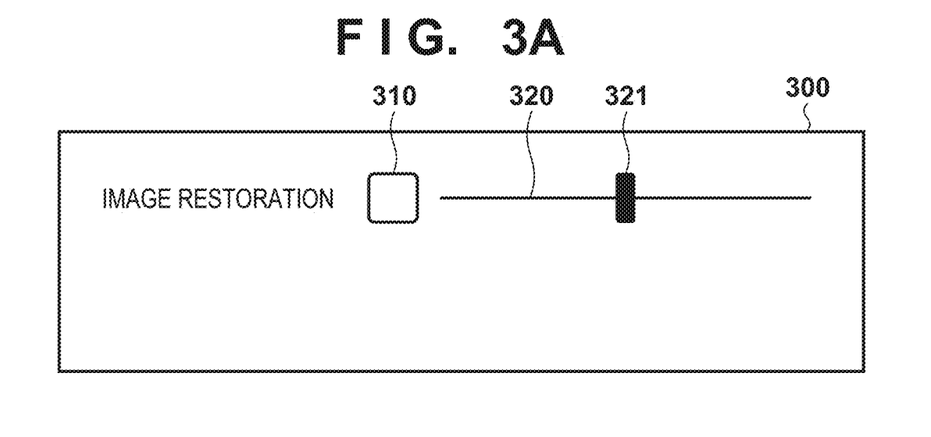
FIGS. 3A to 3C are diagrams illustrating examples of settings screen provided by an embodiment.
Figure 3B:
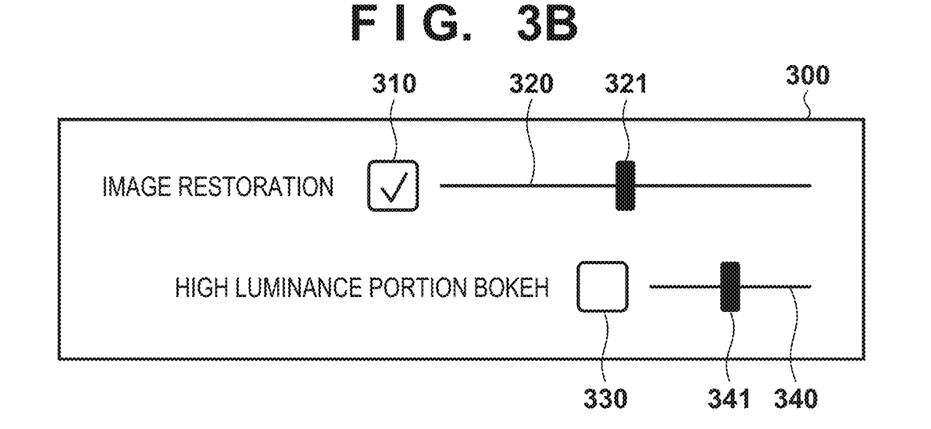
Figure 3C:
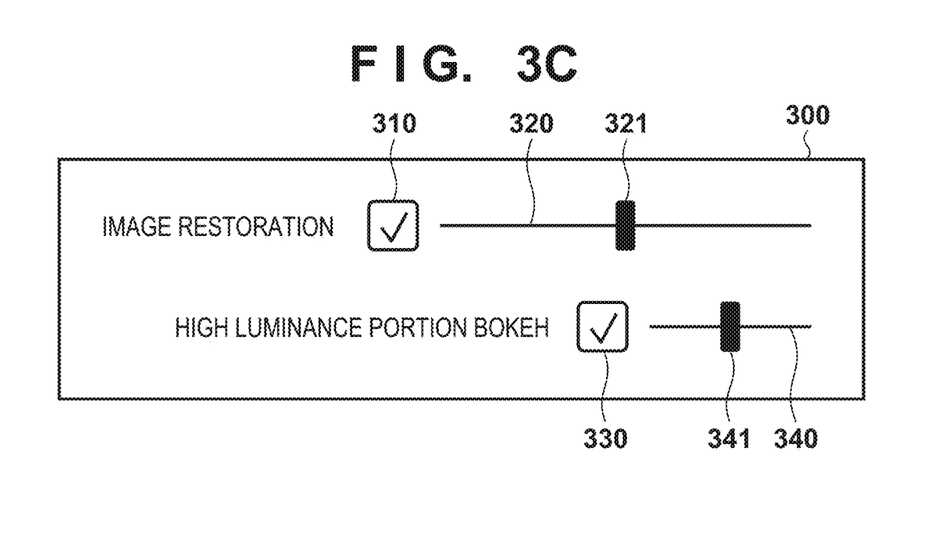

FIGS. 3A to 3C are diagrams illustrating examples of a settings screen 300, which is a user interface that allows the user to set settings relating to image restoration processing. The settings screen can be called out via an operation of the console unit 111 from a menu screen displayed on the display unit 105 by the system controller 110 when an operation of a menu button on the console unit 111 is detected.

FIG. 3A is a diagram illustrating an example of the settings screen 300 with settings for when image restoration is not performed. The settings screen 300 is a GUI for image restoration settings that includes a checkbox 310 for setting whether or not to perform image restoration and a slider 320 for setting the strength of image restoration. The slider 320 includes a knob 321, and the position of the knob 321 corresponds to the strength. For example, the knob 321 at the right end of the slider corresponds to maximum strength, and the knob 321 at the left end of the slider corresponds to minimum strength. In the example of FIG. 3A, the checkbox 310 is not checked and so strength setting via the slider 320 is disabled.

In the state illustrated in FIG. 3A, if the checkbox 310 is checked, the settings screen 300 changes to the state illustrated in FIG. 3B. The check of the checkbox 310 can be switched by a touch operation on the checkbox or a predetermined button operation on the console unit 111.

When the checkbox 310 is checked, a GUI for setting whether or not to provide a bokeh effect to high luminance portions of the image is displayed on the settings screen 300. Specifically, a checkbox 330 and a slider 340 for setting the strength of the bokeh effect to be provided to high luminance portions is additionally displayed. The slider 340 includes a knob 341, and the position of the knob 341 corresponds to the strength. However, in a state in which the checkbox 330 is not checked, operation of the slider 340 and setting strength via the slider 340 is disabled.

Note that the GUI relating to settings for providing a bokeh effect to high luminance portions may be displayed irrespective of the check state of the checkbox 310. For example, in a case in which the checkbox 330 and the slider 340 are displayed in the state illustrated in FIG. 3A, they can be greyed out and/or operation of them can be disabled.

FIG. 3C is a diagram illustrating a state in which, in the state illustrated in FIG. 3B, the checkbox 330 is checked. This enables operation of the slider 340 and strength setting via the slider 340.

The system controller 110, for example, stores the settings relating to image restoration in the non-volatile area of the storage unit 108 on the basis of the state of the settings screen 300 at the point in time where an operation to close the settings screen 300 is detected. In other words, the settings relating to image restoration include:

whether or not to perform image restoration (state of checkbox 310)

strength of image restoration (position of knob 321 of slider 320)

whether or not to provide bokeh effect to high luminance portions (state of checkbox 330)

strength of bokeh effect provided to high luminance portions (position of knob 341 of slider 340).

Note that instead of the position of the knob, the strength may be a value obtained by converting the position of the knob to strength.

In a case in which it is determined to perform image restoration, the image processing unit 104 executes step S202. Otherwise, the processing of the flowchart of FIG. 2 ends.

In step S202, the image processing unit 104 acquires the imaging state via the state detection unit 107. Also, by referencing the non-volatile area of the storage unit 108 on the basis of the imaging state, information relating to an aberration in the imaging optical system 101 corresponding to the imaging state is acquired. Here, information relating to an aberration may be information (OTF information) relating to the OTF of the imaging optical system 101, for example. The OTF information may be the OTF or may be the PSF.

Note that in a case in which the OTF information corresponding to the discrete combinations of the parameters composing the imaging conditions is stored in the storage unit 108, the OTF information matching the acquired imaging state may not be stored. In this case, correction, interpolation, and the like can be performed on one or more piece of OTF information corresponding to a similar combination to acquire OTF information for the acquired imaging state.

In step S203, the image processing unit 104 acquires an image restoration filter (parameters of an image restoration filter) in accordance with the imaging state and the image restoration strength setting. For example, the image processing unit 104 selects, from image restoration filters stored in the storage unit 108, an image restoration filter in accordance with the imaging state and the image restoration strength setting. Note that after an image restoration filter in accordance with the imaging state is selected, the image restoration filter may be corrected according to the strength setting.

Also, in a case in which the image restoration filter corresponding to the discrete combinations of the parameters composing the imaging conditions is stored, the image restoration filter matching the acquired imaging state may not be stored. In this case, correction, interpolation, and the like can be performed on one or more image restoration filter corresponding to a combination similar to the acquired imaging state to generate an image restoration filter for the acquired imaging state. Also, instead of selecting an image restoration filter, an image restoration filter in accordance with the imaging state may be generated from information relating to the OTF and the like. The detailed configuration of the image restoration filter is not limited, and a discretionary filter with a known configuration capable of obtaining the effect of $R(x, y)$ described above can be used.

In step S204, the image processing unit 104 obtains a restored image $f(x, y)$ by applying the image restoration filter $R(x, y)$ acquired in step S203 to each pixel of each color component of the target image $g(x, y)$ as indicated in Formula 5. By applying the image restoration filter, an image with an asymmetrical bokeh component caused an aberration or the like in the imaging optical system 101 removed or reduced can be obtained.

Figure 4A:
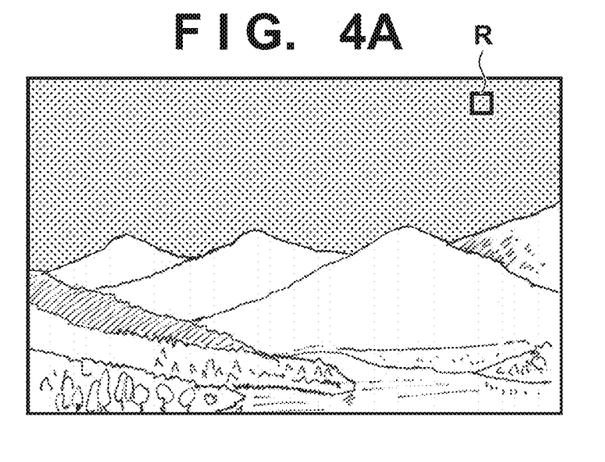
FIGS. 4A to 4D are diagrams for describing the operations and effects of an embodiment.
Figure 4B:
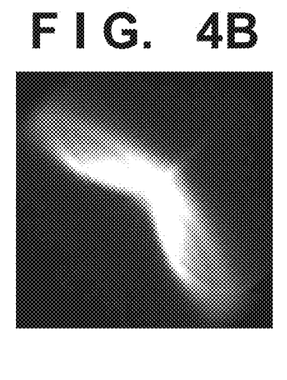
Figure 4C:
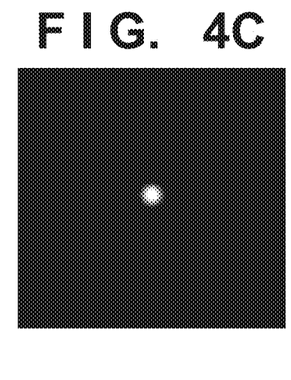

FIGS. 4A to 4D are schematic diagrams for describing the effect of the image restoration processing. FIG. 4A is a diagram illustrating an entire input image showing a starry sky in the upper portion. Also, FIG. 4B is a diagram illustrating an image of a star in a region R in FIG. 4A in a magnified state. The image of a state, which is a point light source, is formed as an image with an asymmetrical bokeh component due to the effects of aberration or diffraction in the imaging optical system 101. By applying the image restoration filter, the asymmetrical bokeh component is removed or reduced, and the image is corrected to its true form as illustrated in FIG. 4C.

In step S205, the image processing unit 104 references the image restoration settings stored in the storage unit 108 and determines whether or not to perform adjustment (provide a bokeh effect) on the high luminance portions. In a case in which the checkbox 330 on the settings screen 300 described using FIGS. 3A to 3C is checked, the setting is set to providing the bokeh effect to the high luminance portions. In a case in which the image processing unit 104 determines to perform adjustment on the high luminance portions, step S206 is executed. Otherwise, the processing illustrated in the flowchart of FIG. 2 ends. In a case in which the processing ends, an image with only recovery processing applied is obtained.

In step S206, the image processing unit 104 detects the high luminance portions from the input image. The image processing unit 104 can detect, as a high luminance portion, pixels with a value equal to or greater than a threshold set in advance on the basis of the characteristics of the image sensor 102. The image processing unit 104 may generate a high luminance map indicating the pixel coordinates of the detected high luminance portions.

In step S207, the image processing unit 104 generates a filter B(x, y) for providing a bokeh effect to high luminance portions. In the present embodiment, a configuration using a Gaussian filter is used as an example.

$$B(x,y)=1/(2\pi\sigma^2)\exp\{-(x^2-y^2)/2\sigma^2\} \quad \text{(Formula 6)}$$

In Formula 6, x, y represents the position of the tap of the filter, and σ represents a parameter for controlling the bokeh size. By setting the σ on the basis of the OTF information of the imaging optical system 101 acquired in step S202, a bokeh effect based on the characteristics of the imaging optical system 101 can be provided.

For example, because smaller values for the MTF of the imaging optical system 101 indicate a state with a large aberration in the imaging optical system 101, the image processing unit 104 sets the σ to a large value to strengthen the bokeh effect of regions with a small MTF value. As described above, the MTF can be obtained as an amplitude component of the OTF.

Also, in a case in which the PSF is acquired as the OTF information in step S202, the image processing unit 104 may increase the σ as the spread of the PSF increases. Alternatively, the image processing unit 104 may acquire a correction strength from the characteristics of the image restoration filter acquired in step S203 and set the σ to a larger value the large the strength is.

In this manner, the image processing unit 104 can generate a filter (bokeh effect filter) that provides a greater bokeh effect the greater the aberration is in the imaging optical system 101.

The information relating to the OTF indicates the characteristics that typically differ depending on the distance from the optical axis. Thus, the image processing unit 104 may generate a plurality of bokeh effect filters depending on the distance from the optical axis. In this case, a bokeh effect filter in accordance with the distance from the optical axis for the target pixel is applied. Alternatively, a bokeh effect filter common for the entire image may be generated by the image processing unit 104 on the basis of representative characteristics (for example, average characteristics).

In a case in which the user sets the strength of the bokeh effect, in addition to the size of the aberration in the imaging optical system 101 described above, the image processing unit 104 reflects the strength corresponding to the user setting in the σ of Formula 6.

Note that in the case of one or more of the following:
in a case in which the aberration in the imaging optical system 101 is determined to be sufficiently small,
in a case in which the strength setting for image restoration is determined to be low,
in a case in which the strength setting for the bokeh effect is determined to be low,
the image processing unit 104 skips the processing from step S206 onward and may not execute processing to apply a filter for providing a bokeh effect. This can be determined using a predetermined threshold. For example, in a case in which the MTF at a predetermined image height is equal to or greater than a threshold, the size of the aberration may be determined to be sufficiently small. Alternatively, the image processing unit 104 may apply, as a bokeh effect filter, a filter (with a coefficient of 1 only at the filter center and 0 elsewhere) that outputs the input image without change.

In step S208, the image processing unit 104 provides a bokeh effect to the high luminance portions in the input image by applying the bokeh effect filter generated in step S207 to a pixel of a high luminance portion. A pixel of a high luminance portion can be specified on the basis of a high luminance map of the input image.

Specifically, the image processing unit 104 determines, using the high luminance map, whether a high luminance pixel is included in an image region (range of x, y in Formula 6) used in the convolution operation for applying the bokeh effect filter. Also, in a case in which a high luminance pixel is included, the bokeh effect filter is applied to the target pixel.

Alternatively, the image processing unit 104 may generate an image obtained by applying the bokeh effect filter to all of the pixels of an image and combine the image provided with a bokeh effect with the original image on the basis of the high luminance map. In this case, in the region around the high luminance pixel of the original image, the image provided with the bokeh effect is merged.

Note that for saturated pixels of the high luminance pixels, the bokeh effect filter is preferably processed after increasing the signal value. This is because an image with brightness different from the true brightness is obtained if the luminance of a saturated pixel is reduced by smoothing via a bokeh effect filter.

Figure 4D:
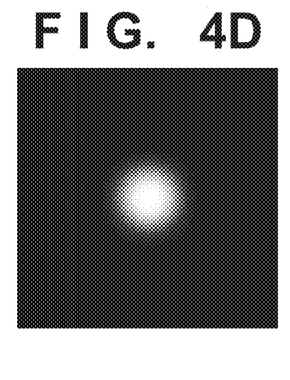

FIG. 4D is a diagram illustrating an example of the image of a star (high luminance portion) illustrated in FIG. 4C with the bokeh effect filter applied. The asymmetrical depiction due to an aberration such as that illustrated in FIG. 4B prior to image restoration has been reduced via image restoration, and a uniform blue has been added. Thus, an image with high image quality and the appearance of the size of the light source as is can be generated. Also, because the addition of bokeh is limited to the high luminance portions of the image and therearound, as in the scene illustrated in FIG. 4A, the landscape portion in the lower portion of the image can be output in a state of high resolution obtained via image restoration processing.

In a case in which the aberration in the imaging optical system is small, as long as the change in the image from image restoration processing is small and the size of the bokeh to be added is not set to large by the user, a filter for outputting the input image without change as described above is used, meaning that bokeh is not added. Thus, even in a case in which the aberration in the imaging optical system is small, an image can be output without greatly changing the appearance of the photo from when captured.

In the above-described examples, a bokeh effect is added using a Gaussian filter. However, the bokeh effect may be added using a different filter or method. In a case in which a filter is not used, for example, the bokeh effect can be provided by holding pixel data indicating the bokeh shape as a template, selecting or editing and adding the template on the basis of the aberration information of the imaging optical system 101 to the image.

Figure 5:
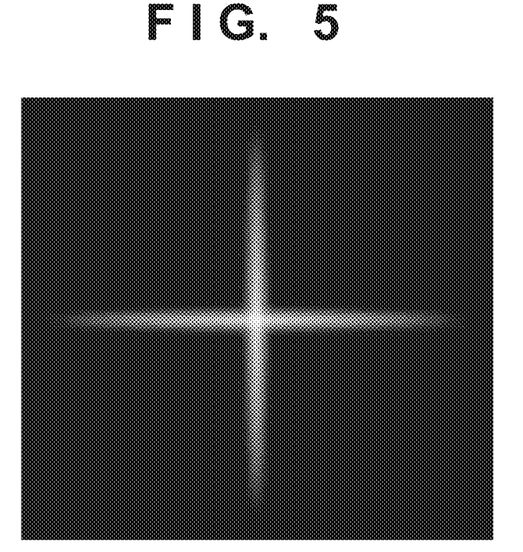
FIG. 5 is a diagram illustrating an example of a usable template image of an embodiment.

For example, image data of the light beam pattern illustrated in FIG. 5 is stored in the storage unit 108 as a template. Then, the image data is expanded or contracted according to the size of the aberration in the imaging optical system 101 and added to the image of the high luminance portions. Even with such processing, a bokeh effect with a shape corresponding to the aberration in the imaging optical system 101 can be added.

The image data after image restoration (and after a bokeh effect has been provided to the high luminance portions in accordance with the settings) is used in generating image data for storing, image data for display, and the like by the image processing unit 104. Note that the original image and the image after the image restoration processing may be displayed on the display unit 105 so that they can be compared.

According to the present embodiment, a bokeh effect can be provided to high luminance portions in a case in which image restoration processing is applied to correct bokeh caused by an aberration. Thus, high image quality achieved by correcting bokeh caused by an aberration in an imaging optical system and representation by the bokeh of high luminance portions can both be effectively achieved.

Second Embodiment

Next, the second embodiment of the present invention will be described. In the present embodiment, the image restoration and provision of the bokeh effect to the high luminance portions of the first embodiment are performed using a machine learning model.

Machine learning models include neural networks, genetic programming, Bayesian networks, and the like, for example. Neural networks include convolutional neural networks (CNN), generative adversarial networks (GAN), recurrent neural network (RNN), and the like.

Hereinafter, the stage at which the weights of the machine learning model are learned is referred to as the learning phase. Also, the stage at which the image restoration is performed and the bokeh effect is added to the high luminance portions by the machine learning model using the learned weights is referred to as the estimating phase.

Figure 6:
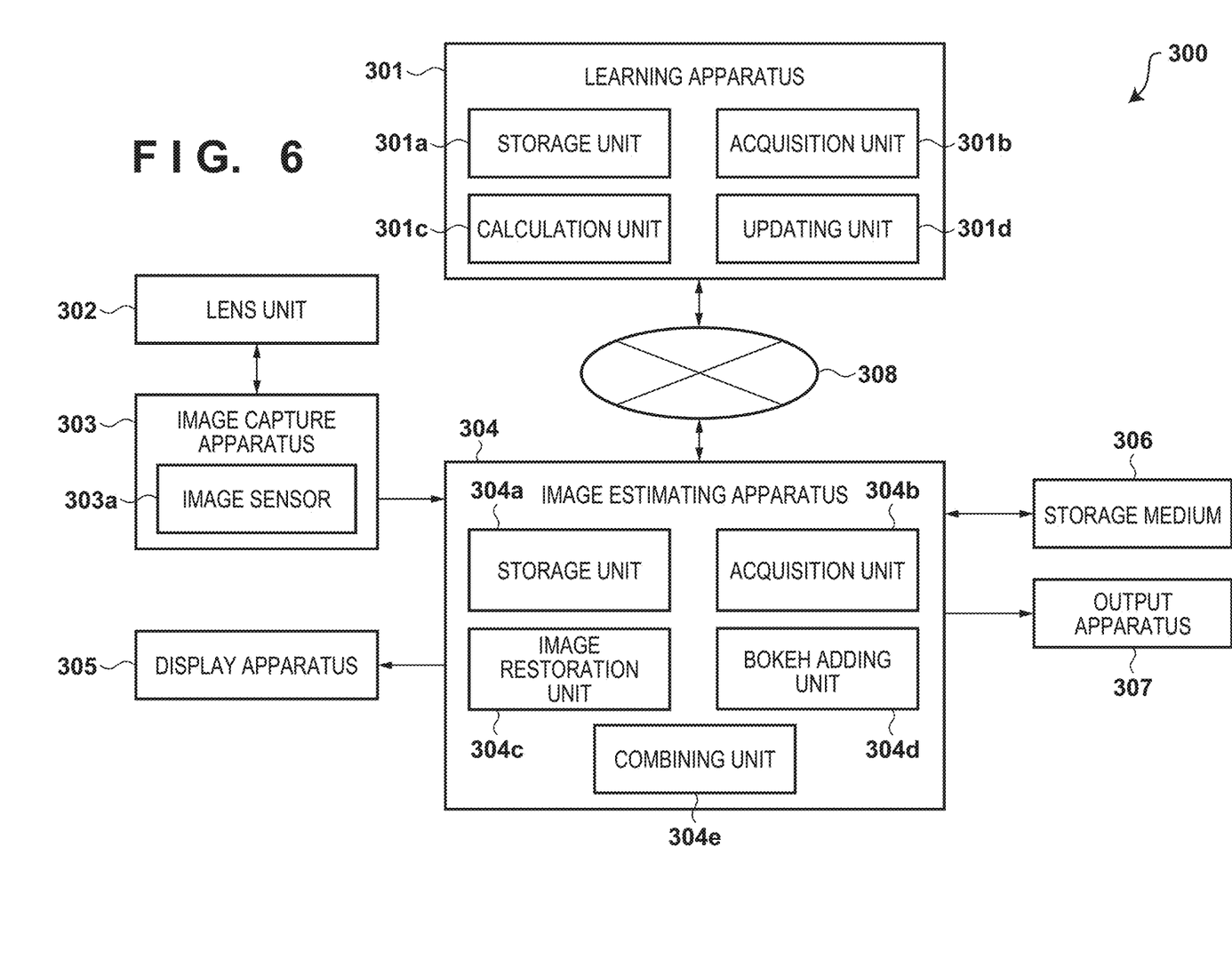
FIG. 6 is a block diagram illustrating an example of the functional configuration of an image processing system according to a second embodiment.
Figure 7:
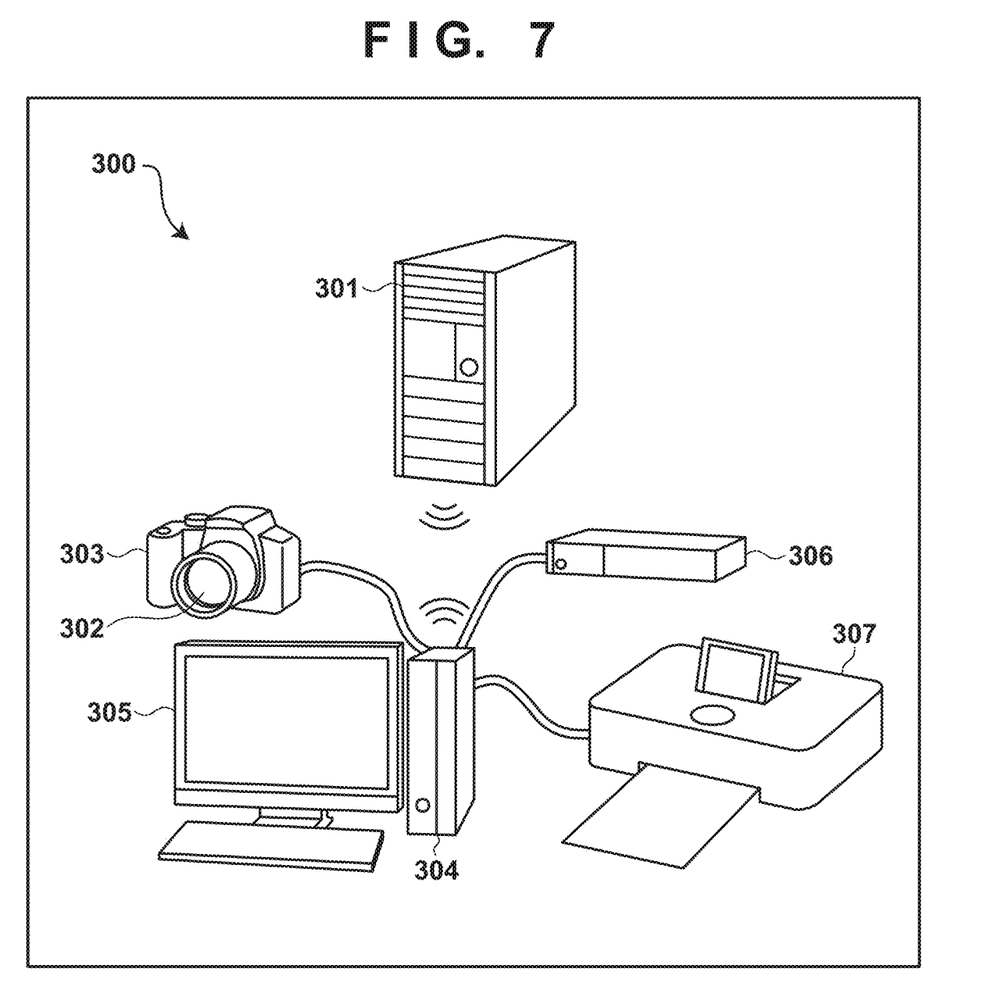
FIG. 7 is a diagram illustrating an example of the appearance of the image processing system according to the second embodiment.

FIG. 6 is a block diagram illustrating an example of the configuration of an image processing system 300 according to the present embodiment. FIG. 7 is a diagram illustrating an example of the appearance of the image processing system 300. The image processing system 300 includes a learning apparatus (image processing apparatus) 301, a lens unit 302, an image capture apparatus 303, an image estimating apparatus 304, a display apparatus 305, a storage medium 306, an output apparatus 307, and a network 308.

The learning apparatus 301 is a server apparatus on a network, for example, and may be a typical computing device. By executing a learning application, the computing device functions as the learning apparatus 301. The learning apparatus 301 includes a storage unit 301a, an acquisition unit 301b, a calculation unit 301c, and an updating unit 301d and learns the weights of the machine learning model used in image restoration and addition of the bokeh effect to high luminance portions.

The storage unit 301a is a storage apparatus such as a non-volatile memory, a hard disk, or the like. Also, other blocks are described as separate blocks for the sake of convenience. However, in actuality, these functions are implemented by a processor executing programs. Note that weight learning and processing using the weights will be described below in detail.

The lens unit 302 is an exchangeable lens detachably attached to the image capture apparatus 303. Depending on the model, the lens unit 302 has different focal lengths, diaphragms, and focal length ranges. Also, because the PSF (or OTF) of the lens unit 302 is different depending on the model, the shape of a bokeh caused by an aberration or diffraction in the lens unit 302 is also different.

The image capture apparatus 303 includes an image sensor 303a. For the image sensor 303a, one or more of the followings may be different depending on the type: the presence of an optical low-pass filter; type of optical low-pass filter (separation method, cut-off frequency, and the like); pixel pitch (including pixel opening); configuration of color filter array, and the like.

The image estimating apparatus 304 is a typical computing device similar to the server apparatus and, for example, is a personal computer used by the user of the image processing system 300. By the computing device executing a specific application, the computing device functions as the image estimating apparatus described below.

The image estimating apparatus 304 includes a storage unit 304a, an acquisition unit 304b, an image restoration unit 304c, a bokeh adding unit 304d, and a combining unit 304e. Of these, the storage unit 304a is a storage apparatus such as a non-volatile memory, a hard disk, or the like. Also, other blocks are described as separate blocks for the sake of convenience. However, in actuality, these functions are implemented by a processor executing programs.

The image estimating apparatus 304, for an image captured by the image capture apparatus 303, corrects bokeh caused by an aberration or diffraction in the lens unit 302 and generates an image with a bokeh effect provided to the high luminance portions. Different combinations of the lens unit 302 and the image capture apparatus 303 may be connected to the image estimating apparatus 304. The image estimating apparatus 304 uses the machine learning model using the weights learned by the learning apparatus 301 and generates an image (hereinafter, referred to as a restored image) obtained by performing image restoration and providing a bokeh effect to the high luminance portions on the captured image.

The learning apparatus 301 and the image estimating apparatus 304 are connected via the network 308. The network 308 may include a plurality of networks. The networks may be wired networks and/or wireless networks.

The image estimating apparatus 304 acquires information of the learned weights from the learning apparatus 301 at a discretionary timing before the machine learning model is applied to the original image. The image estimating apparatus 304 outputs the restored image to at least one of the display apparatus 305, the storage medium 306, or the output apparatus 307. The display apparatus 305 may be a liquid crystal display or a projector, for example.

The user can perform editing tasks while checking the image being processed displayed on the display apparatus 305. The storage medium 306 is a semiconductor memory, a hard disk, or a server on a network, for example. The output apparatus 307 is a printer, for example.

Figure 8:
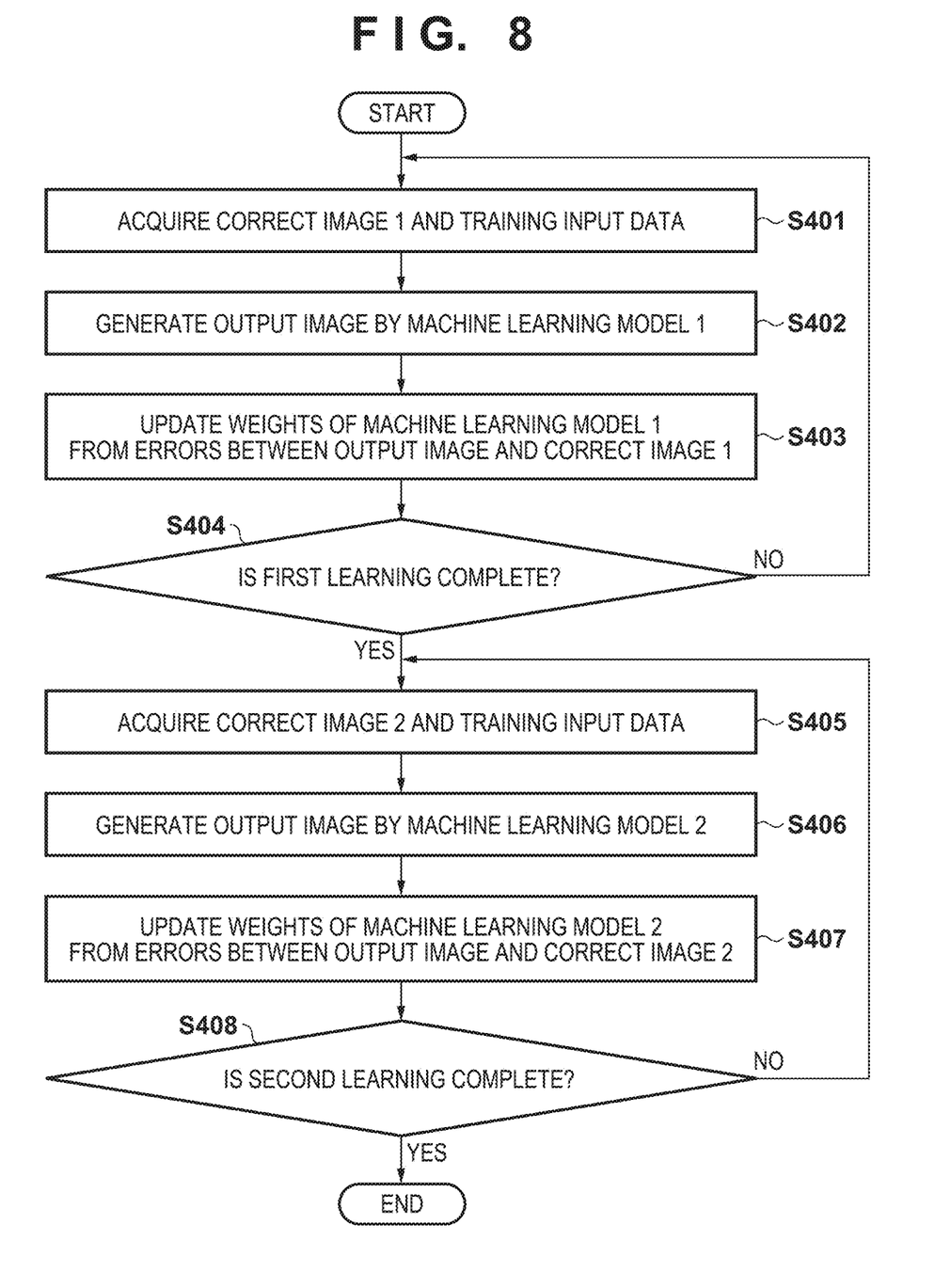
FIG. 8 is a flowchart relating to the operations in a learning phase in the second embodiment.

Next, the learning (learning phase) of the weights by the learning apparatus 301 will be described using the flowchart illustrated in FIG. 8. In the present embodiment described herein, a machine learning model using CNN is used. However, the weights can be learned in a similar manner using a different machine learning model.

In step S401, the acquisition unit 301b acquires training data including one or more sets including a correct image 1 and a training image from the storage unit 301a. For each combination of models of the lens unit 302 and the image capture apparatus 303, training image is stored in advance in the storage unit 301a.

In the present embodiment, the weights are learned for each model of the lens unit 302. Thus, the acquisition unit 301b first determines the model of the lens unit 302 for learning the weights. Then, a training image corresponding to the model of the determined lens unit 302 is acquired.

The collection of training images corresponding to one model of the lens unit 302 is a collection of images with different combinations of lens unit state (focal length, f-number, focusing distance (object distance), image sensor of corresponding image capture apparatus state (image height and azimuth, presence and type of optical low-pass filter, pixel pitch, color filter pattern), and the like (in other words, images in which bokeh originating from the optical system including an aberration in the lens unit and the like).

These training images may be acquired via actual image capture. However, characteristic information of the OTF of the lens unit 302 and the like can be used to generate the training images from an original image. The correct image 1 however is an image without bokeh originating from the optical system. The training image corresponds to an image with bokeh such as that illustrated in FIG. 4B, and the correct image 1 thereof corresponds to an image with corrected bokeh such as that illustrated in FIG. 4C.

In step S402, the calculation unit 301c inputs the training images into the CNN and generates an output image.

In step S403, the updating unit 301d uses a known method to update the weights of the CNN from the errors between the output image and the correct image 1.

In step S404, the updating unit 301d determines whether or not a first learning is complete on the basis of the magnitude of the error, for example. In a case in which the updating unit 301d determines that the first learning is complete, the weights of the CNN at the point in time are stored in the storage unit 301a as weight information of a machine learning model 1, and the processing proceeds to step S405. In a case in which the updating unit 301d does not determine that the first learning is complete, the processing returns to step S401.

In step S405, the acquisition unit 301b acquires one or more sets including a correct image 2 and a training image from the storage unit 301a. The training image may be the same as acquired in step S401. However, the correct image 2 is an image with the bokeh effect added to the high luminance portions of the correct image 1 and corresponds to the image illustrated in FIG. 4D, for example.

The provided bokeh effect takes the characteristics such as the OTF of the lens unit 302 as described in the first embodiment into account. In a case in which the bokeh effect to be provided is weak, as in the case in which the aberration in the lens unit 302 is small, the same image as the training image may be used as the correct image 2.

In step S406, the calculation unit 301c inputs the training images into the CNN and generates an output image.

In step S407, the updating unit 301d uses a known method to update the weights of the CNN from the errors between the output image and the correct image 2.

In step S408, the updating unit 301d determines whether or not a second learning is complete on the basis of the magnitude of the error, for example. In a case in which the updating unit 301d determines that the second learning is complete, the weights of the CNN at the point in time are stored in the storage unit 301a as weight information of a machine learning model 2, and the processing illustrated in the flowchart ends. In a case in which the updating unit 301d does not determine that the second learning is complete, the processing returns to step S405.

Figure 9:
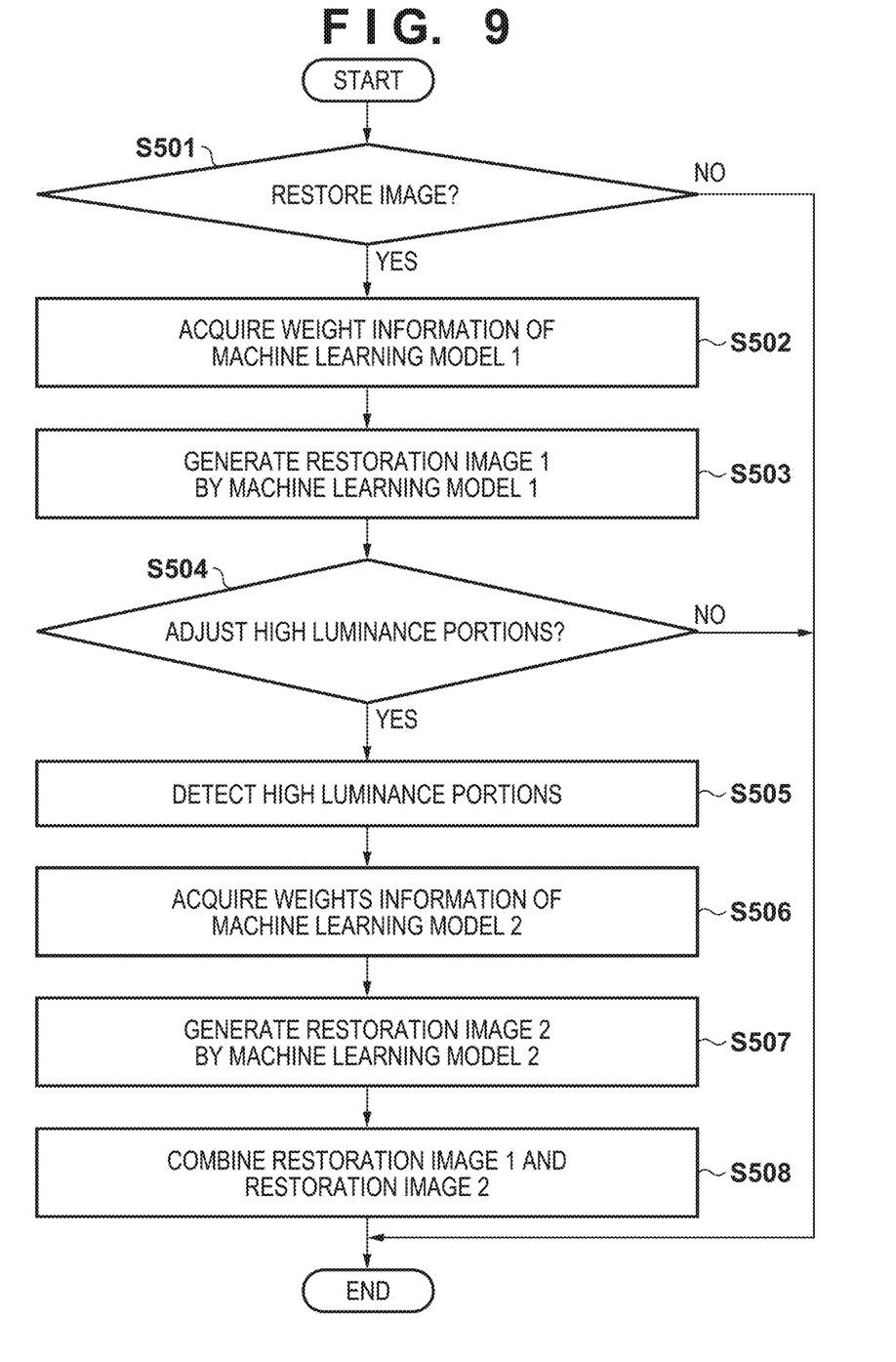
FIG. 9 is a flowchart relating to the operations in an estimating phase in the second embodiment.

Next, the generation processing (estimating phase) of the restored image executed by the image estimating apparatus 304 will be described using the flowchart of FIG. 9.

In step S501, the acquisition unit 304b determines whether or not to apply image restoration processing. For example, the acquisition unit 304b can determine this on the basis of whether or not a user setting stored in the storage unit 304a is a setting to be applied to the image restoration processing. In the present embodiment also, as in the first embodiment, the settings relating to the image restoration processing are stored in the storage unit 304a. In a case in which it is determined to perform image restoration, the acquisition unit 304b executes step S502. Otherwise, the processing of the flowchart of FIG. 9 ends.

In step S502, the acquisition unit 304b acquires the weights of the machine learning model 1 corresponding to the model of the lens unit 302 that captured the input image from the learning apparatus 301 and stores the weights in the storage unit 304a. Note that if there are the weights of the machine learning model 1 corresponding to the combination of the model of the lens unit 302 and the device type of the image capture apparatus 303, then these may be acquired. The model name of the lens unit 302 and the image capture apparatus 303 can be identified from the metadata of the image.

In step S503, the image restoration unit 304c sets the weights of the machine learning model 1 stored in the storage unit 304a in the CNN. Then, the input image is input into the CNN, and a restored image 1 is generated.

In step S504, the acquisition unit 304b references the image restoration settings stored in the storage unit 304a and determines whether or not to perform adjustment (provide a bokeh effect) on the high luminance portions. In a case in which the acquisition unit 304b determines to perform adjustment on the high luminance portions, the processing proceeds to step S505. Otherwise, the processing illustrated in the flowchart of FIG. 9 ends. In a case in which the processing ends, an image with only recovery processing applied is obtained.

In step S505, the acquisition unit 304b detects the high luminance portions from the input image. The acquisition unit 304b can detect, as a high luminance portion, pixels with a value equal to or greater than a threshold set in advance on the basis of the characteristics of the image sensor 102. The acquisition unit 304b may generate a high luminance map indicating the pixel coordinates of the detected high luminance portions.

In step S506, the acquisition unit 304b acquires the weights of the machine learning model 2 corresponding to the model of the lens unit 302 that captured the input image from the learning apparatus 301 and stores the weights in the storage unit 304a. Note that if there are the weights of the machine learning model 2 corresponding to the combination of the model of the lens unit 302 and the device type of the image capture apparatus 303, then these may be acquired. Note that the weights of the machine learning model 1 and the weights of the machine learning model 2 may be acquired at the same time.

In step S507, the image restoration unit 304c sets the weights of the machine learning model 2 stored in the storage unit 304a in the CNN. Then, the input image is input into the CNN, and a restored image 2 is generated. The input image is the same as that used in step S503.

In step S508, the combining unit 304e combines the restored image 1 and the restored image 2. The combining unit 304e performing combining so that the high luminance pixels and the surrounding region of the restored image 1 that has been applied image restoration processing to be substituted with the restored image 2 that has been added the bokeh effect. A combining method other than substitution may be used. The high luminance pixel and the surrounding region can be identified using the high luminance map.

In the present embodiment, instead of using an image restoration filter or a bokeh providing filter, a machine learning model may be used to generate an image, from the input image, subjected to image restoration processing and an image with a bokeh effect provided to the high luminance portions. According to the present embodiment, a similar effect to that obtained by the first embodiment can be obtained.

Also, even in a case in which the MTF decreases to nearly zero by using a machine learning model, for example, because the spatial frequency spectrum of the object can be estimated with high accuracy, the bokeh correction accuracy via image restoration can be improved.

Because the bokeh effect is provided only to the high luminance portions of the image and the surrounding regions, when processing is executed on the input image such as that illustrated in FIG. 4A, the landscape portion in the lower portion of the image can have an increased resolution via the image restoration processing. Also, regarding the starry sky portion in the upper portion of the image, because a symmetrical bokeh effect (round bokeh effect) is provided to the image of a star, representation using bokeh can be achieved.

As described in the first embodiment, in a case in which the aberration in the lens unit 302 is sufficiently small, the change in the image due to the image restoration processing is small or the bokeh effect is essentially not provided. Thus, even in a case in which the settings are set to execute image restoration processing or provide a bokeh effect, if the aberration in the lens unit 302 is small, the appearance of the original image does not greatly change.

Other Embodiments

The embodiment described above has a configuration in which a symmetrical bokeh effect is provided to high luminance portions of an image subjected to image restoration processing. However, a different effect may be provided to high luminance portions of an image subjected to image restoration processing. For example, an effect of a light beam pattern created by the blades of the diaphragm or a star pattern obtained by a cross filter can be provided. In such cases also, a method of applying a filter or a method via combining can be used.

Also, the second embodiment described above has a configuration in which the external apparatus of the image capture apparatus executes the image restoration processing and provides the effect to high luminance portions. However, similar processing to the image estimating apparatus 304 may be executed by the image processing unit 104 of the first embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-181437, filed on Nov. 5, 2021, which is hereby incorporated by reference herein in its entirety.

What is claimed is:

1. An image processing apparatus comprising:
one or more processors, when executing a program stored in a memory, function as:
a restoration unit configured to apply, to an input image, image restoration processing for correcting bokeh caused by a characteristic of an imaging optical system used to capture the input image, based on settings of the image restoration including a setting regarding whether to add a predetermined effect to the input image to which the image restoration processing has been applied, wherein the predetermined effect is related to a photographic expression that is corrected by the image restoration process; and
an application unit configured to add the predetermined effect to a high luminance portion satisfying a first predetermined condition in the input image to which the image restoration processing has been applied, in a case where the settings of the image restoration include a setting indicating that the predetermined effect to be added to the input image to which the image restoration processing has been applied.

2. The image processing apparatus according to claim 1, wherein
the application unit adds a symmetrical bokeh effect to the high luminance portion.

3. The image processing apparatus according to claim 1, wherein
the application unit adds a light beam pattern or a star pattern to the high luminance portion.

4. The image processing apparatus according to claim 1, wherein
the application unit adds the predetermined effect by taking the characteristic of the imaging optical system into account.

5. The image processing apparatus according to claim 4, wherein
larger aberrations of the imaging optical system are directly related to the strength of the predetermined effect to be added by the application unit.

6. The image processing apparatus according to claim 4, wherein the application unit does not add the predetermined effect in a case where a size of an aberration in the imaging optical system satisfies a second predetermined condition, even if the settings of the image restoration include the setting indicating that the predetermined effect to be added to the input image to which the image restoration processing has been applied.

7. The image processing apparatus according to claim 1, wherein the restoration unit applies the image restoration processing to the input image by applying, to the input image, a filter based on the characteristic of the imaging optical system.

8. The image processing apparatus according to claim 1, wherein the restoration unit applies the image restoration processing to the input image by inputting the input image into a trained machine learning model.

9. The image processing apparatus according to claim 1, wherein the one or more processors, when executing the program, further function as:

a provision unit configured to provide a user interface that allows a user to set whether or not to apply the image restoration processing and set whether or not to add the predetermined effect.

10. An image capture apparatus comprising:

an image sensor; and an image processing apparatus, wherein the image processing apparatus comprising:

one or more processors, when executing a program stored in a memory, function as:

a restoration unit configured to apply, to an input image captured by the image sensor, image restoration processing for correcting bokeh caused by a characteristic of an imaging optical system used to capture the input image, based on settings of the image restoration including a setting regarding whether to add a predetermined effect to the input image to which the image restoration processing has been applied, wherein the predetermined effect is related to a photographic expression that is corrected by the image restoration process; and an application unit configured to add the predetermined effect to a high luminance portion satisfying a predetermined condition in the input image to which the image restoration processing has been applied, in a case where the settings of the image restoration include a setting indicating that the predetermined effect to be added to the input image to which the image restoration processing has been applied.

11. An image processing method executed by an image processing apparatus comprising:

applying, to an input image, image restoration processing for correcting bokeh caused by a characteristic of an imaging optical system used to capture the input image, based on settings of the image restoration including a setting regarding whether to add a predetermined effect to the input image to which the image restoration processing has been applied, wherein the predetermined effect is related to a photographic expression that is corrected by the image restoration process; and adding the predetermined effect to a high luminance portion satisfying a predetermined condition in the input image to which the image restoration processing has been applied, in a case where the settings of the image restoration include a setting indicating that the predetermined effect to be added to the input image to which the image restoration processing has been applied.

12. A non-transitory computer-readable medium that stores a program for causing, when executed by one or more processor, the one or more processors to function as an image processing apparatus comprising:

a restoration unit configured to apply, to an input image, image restoration processing for correcting bokeh caused by a characteristic of an imaging optical system used to capture the input image, based on settings of the image restoration including a setting regarding whether to add a predetermined effect to the input image to which the image restoration processing has been applied, wherein the predetermined effect is related to a photographic expression that is corrected by the image restoration process; and an application unit configured to add the predetermined effect to a high luminance portion satisfying a predetermined condition in the input image to which the image restoration processing has been applied, in a case where the settings of the image restoration include a setting indicating that the predetermined effect to be added to the input image to which the image restoration processing has been applied.

* * * * *